T. H. SMITH.
Corn Planter.
No. 81,548.  Patented Aug. 25, 1868.
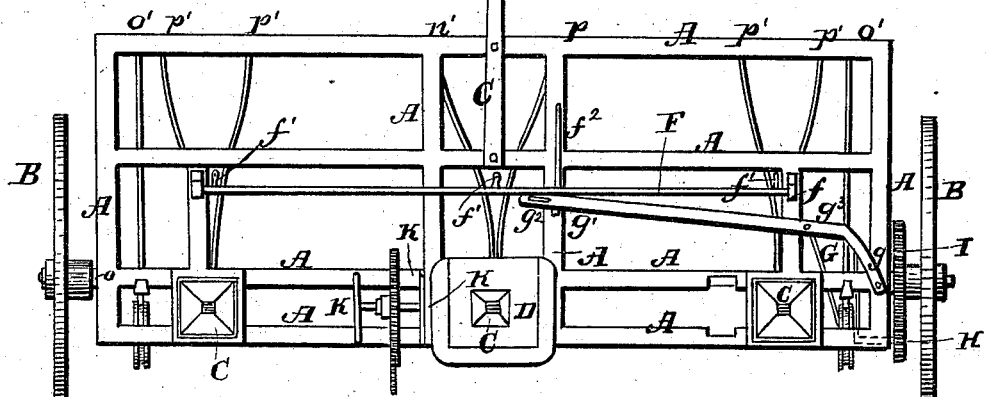
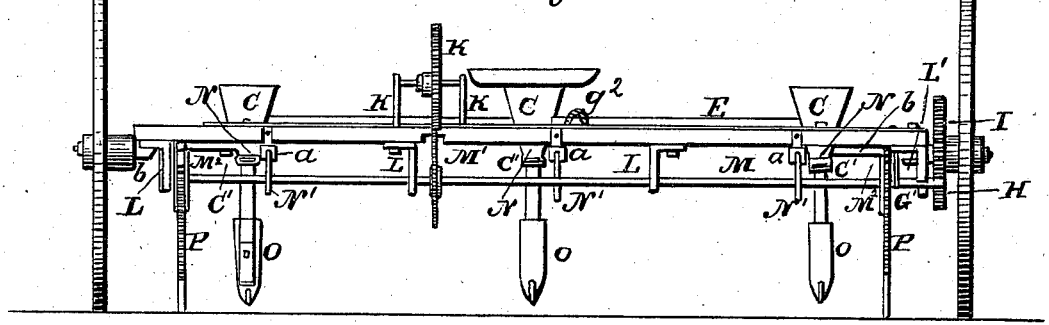
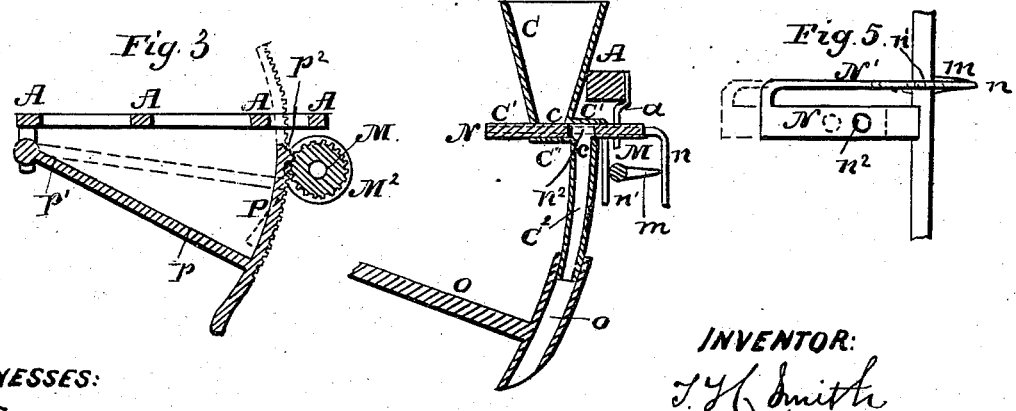
WITNESSES:
J. Fraser
Jacob Henry
INVENTOR:
T. H. Smith
by
Hedersheim & Co.
Attorney

United States Patent Office.

T. H. SMITH, OF CLYDE, NEW YORK.

Letters Patent No. 81,548, dated August 25, 1868.

---

IMPROVEMENT IN SEED-PLANTERS.

---

*The Schedule referred to in these Letters Patent and making part of the same.*

---

TO ALL WHOM IT MAY CONCERN:

Be it known that I, T. H. SMITH, of Clyde, in the county of Wayne, and State of New York, have invented a new and useful Seed-Planter; and I do hereby declare the following is a full, clear, and exact description of the construction and operation of the same, reference being had to the accompanying drawings, making part of this specification, and in which—

Figure 1 is a top view of my seed-planter.

Figure 2 is a rear-end elevation.

Figure 3 is a detailed view of one of the markers, and its adjuncts.

Figure 4 is a vertical central section through a seed-box, with its seed-slide, and conducting-tube, and movable drill-tooth.

Figure 5 is a magnified representation of the seed-slide, with its actuating-mechanism.

The nature of my invention consists in so constructing a machine for planting seed that the seed planted thereby may be cultivated transversely as well as longitudinally, which enables the farmer to cultivate with better effect, and affords a thorough drainage on undulating ground.

To enable others skilled in the art to make and use my invention, I will proceed to describe its construction and operation.

A frame, A A A, fig. 1, supported by two wheels, B B, by means of two short axles, $b\ b$, fastened to said frame, has mounted upon it a tongue, C, a driver's seat, D, several seed-boxes, $C^1\ C^1\ C^1$, a rod, F, with handle and levers $f^1 f^1$, for raising the plows, a foot-lever, G, for moving a gear-wheel, H, to and from another gear-wheel, I, connected with one of the wheels B, a gear-wheel, K, the latter being journalled in suitable supports, $k\ k$.

The same frame has, attached to its under side, angular supporting-plates L L L′, or equivalents, through which a shaft, M, runs the whole length of the frame.

This shaft receives its revolving motion through the pinion H, attached to its end, from the gear-wheel I, and it gives motion to the seed-slides, as well as to the markers.

The slide consists of a plate or board, N, fig. 5, to which is attached a rod, N′, bent into parallelism with the slide N, and provided with two parallel prongs, $n\ n^1$, enclosing the shaft M, and an eccentric-cam or tooth, $m$, fastened to said shaft, as seen in fig. 4. A small guide-plate, $a$, fastened to the frame A, keeps the rod N′ in the proper position while it is being operated by the cam $m$.

The slide or plate N is allowed to slide horizontally in a box, $C^1$, open at both ends, which is fastened to the bottom of the seed-box C. This box $C^1$ is provided with a hole, $c$, in its top, having a central position in the seed-box, and a hole, $c'$, in its bottom, at a distance from the hole $c$ equal to the stroke of the slide derived from the cam $m$. From this hole $c$, the box $C^1$ extends downward, in the shape of a bent tube, $C^2$, the bend being a circular one, having its centre in a pin and fulcrum, $p^1$, under the frame A. Over this tube, the tubular drill-tube O can slide up and down, being bent in the same circle as tube $C^1$, and being pivoted to a fulcrum through the medium of a branching lever, $o$, fig. 4.

The shaft M has two gear-wheels, $M^2\ M^2$, with projecting guide-flanges or rims fastened to it, (fig. 2.) The teeth of the wheel do not extend fully around them, as will be seen from fig. 2, but a portion of the periphery of each of said wheels being left blank, the effect is, that when the markers P P, gearing into said wheels, are lifted as far as indicated by red lines in fig. 3, they are no more supported, as the blank parts of the wheels present themselves to the teeth of the markers, which are consequently obliged to fall down, swinging on the pins $p^1\ p^1$.

The projecting guide-rims to the right and left of the wheels $M^2\ M^2$ prevent the markers from falling aside of said wheels, and losing their connection with them. A horizontal flange, $p^2$, fig. 3, at the top of each marker, falls with it, and stops the marker from descending any further by being itself stopped by the guide-rims on the wheel $M^2$, thus keeping the gear on the marker P in the right position to match in the gearing on wheel $M^2$, as it presents itself again. I prefer the position of these markers as close to the ends of the frame as possible, but I would not confine myself altogether to it.

The two wheels B B must be at such distance from the plows next to them as to form half the breadth of a furrow, so that the driver, running one of the wheels in the wheel-track of his former drive, will make all his furrows equidistant.

The rod F, attached, with end-bearings $f\ f$, to the frame A, is provided with small levers, $f^1 f^1 f^1$, for the purpose of lifting or letting down the plows, to which they are connected in the usual manner. The driver operates this rod with a lever-handle, $f^2$, attached to it.

A lever, G, pivoted to the frame A at $g$, is worked by the foot of the driver, with the aid of a small stirrup, $g^2$, at the end of said lever, and is prevented from a backward movement by a ratchet-tooth, $g^1$, on the frame. A rod, G′, is connected to the lever G at $g^3$, and runs under the frame to the shaft M, which it encloses, thereby the movements of lever G at $g^3$ are communicated to the shaft M in a horizontal direction, for which purpose plate L′ has a horizontal slot, to support the shaft in its different positions. The purpose of this arrangement is to bring the two wheels I and H in contact with each other, or to disengage them. The latter would stop all motion, except that of the wheels B B.

The operation is as follows:

After supplying the seed-boxes, moving the lever G in the position shown in fig. 1, and letting the plows down in the manner described, the driver mounts his seat, and starts the team. The wheel B, by means of wheels I and H, causes the shaft M to revolve with a speed in proportion to the diameters of said wheels, which speed may be changed by exchanging wheels I and H for other wheels of different diameters.

The cam M imparts a back-and-forward motion to the slide N, causing the hole $n^2$ to be filled from the seed-box and emptied into the tube $C^2$ alternately. The gear-wheels $M^2 M^2$ lift and drop the markers P P with each revolution, which causes them to make distinct marks of equal distance in the ground.

Having finished one length of the furrows, the driver, with the aid of the stirrup $g^2$, lifts the lever G over the ratchet-tooth $g^1$, and moves it toward his seat, thereby stopping the planting-mechanism. Then he lifts up the handle $f^2$, thereby raising the plows, and, finally, he wheels around to commence a new set of furrows, taking care that the one of wheels B next to the finished furrows gets into the track of the other wheel left from the former trip. Arriving opposite one of the above-described marks, he turns the hand-wheel K, which gears into wheel $M^1$, causing the shaft M to revolve, with its attachments. As soon as the markers P P drop, he is ready to commence planting again, in the manner above described.

After the planting is finished, with a little care and attention, it will be found that the planted corn forms straight lines, in a direction at a right-angle to the furrows, as well as in the direction of the furrows. A brush, of any suitable form, may be fixed within each hopper, to brush the superfluous seed from the hole in the slide as the latter recedes.

Having thus described my invention, what I claim as new, and desire to secure by Letters Patent of the United States, is—

1. The combination of frame A, wheels B, gear-wheels H I, hand-wheel K, wheel $M^1$, shaft M, wheels $M^2 M^2$, and markers P P, all arranged and operating substantially as and for the purpose set forth.

2. The seed-boxes $C^1 C^1$, in combination with the slides N, rods N′, and cams $m$, constructed, arranged, and operating as described.

3. The regulating hand-wheel K and wheel $M^1$, in combination with the shaft M, wheels $M^2 M^2$, and markers P P, arranged and operating in the manner and for the purpose explained.

To the above specification of my improved corn-planter I have signed my name, this ninth day of June, 1868.

T. H. SMITH.

Witnesses:
S. J. CHILD,
T. JAY LEWIS.